US009094578B2

(12) United States Patent
Newell

(10) Patent No.: US 9,094,578 B2
(45) Date of Patent: Jul. 28, 2015

(54) PAY-PER-VIEW SHARING

(75) Inventor: Nicholas B. Newell, Highlands Ranch, CO (US)

(73) Assignee: EchoStar Technologies L.L.C., Englewood, CO (US)

( * ) Notice: Subject to any disclaimer, the term of this patent is extended or adjusted under 35 U.S.C. 154(b) by 1413 days.

(21) Appl. No.: 12/174,500

(22) Filed: Jul. 16, 2008

(65) Prior Publication Data

US 2010/0017831 A1 Jan. 21, 2010

(51) Int. Cl.
*H04N 7/167* (2011.01)
*H04N 7/173* (2011.01)
*H04N 21/435* (2011.01)
*H04N 21/266* (2011.01)
*H04N 7/16* (2011.01)
*H04N 21/418* (2011.01)
*H04N 21/254* (2011.01)
*H04N 21/2543* (2011.01)
*H04N 21/472* (2011.01)
*H04N 21/61* (2011.01)
*H04N 21/6547* (2011.01)

(52) U.S. Cl.
CPC ........... *H04N 7/17318* (2013.01); *H04N 7/163* (2013.01); *H04N 7/1675* (2013.01); *H04N 21/2541* (2013.01); *H04N 21/2543* (2013.01); *H04N 21/26606* (2013.01); *H04N 21/26613* (2013.01); *H04N 21/4181* (2013.01); *H04N 21/435* (2013.01); *H04N 21/47211* (2013.01); *H04N 21/6143* (2013.01); *H04N 21/6187* (2013.01); *H04N 21/6547* (2013.01)

(58) Field of Classification Search
CPC . H04N 7/1675; H04N 7/163; H04N 21/4181; H04N 21/26606; H04N 21/435
USPC .......................... 725/25–31, 104, 1–8, 29–31
See application file for complete search history.

(56) References Cited

U.S. PATENT DOCUMENTS

| | | | |
|---|---|---|---|
| 6,199,114 B1 * | 3/2001 | White et al. ................... | 709/229 |
| 7,870,273 B2 * | 1/2011 | Watson et al. ................ | 709/229 |
| 2002/0144273 A1 * | 10/2002 | Reto ............................... | 725/86 |
| 2003/0041108 A1 * | 2/2003 | Henrick et al. ............... | 709/205 |
| 2003/0097655 A1 * | 5/2003 | Novak ............................ | 725/31 |
| 2004/0237100 A1 * | 11/2004 | Pinder et al. ..................... | 725/31 |
| 2005/0210499 A1 * | 9/2005 | Shima ............................... | 725/8 |
| 2005/0275758 A1 * | 12/2005 | McEvilly et al. .............. | 348/725 |
| 2006/0037037 A1 * | 2/2006 | Miranz ............................. | 725/2 |
| 2006/0107285 A1 * | 5/2006 | Medvinsky ..................... | 725/25 |
| 2007/0172067 A1 * | 7/2007 | Otal et al. ..................... | 380/277 |
| 2007/0217612 A1 * | 9/2007 | So ................................. | 380/277 |
| 2008/0040283 A1 * | 2/2008 | Morris ............................. | 705/59 |
| 2009/0165055 A1 * | 6/2009 | Chaudhry ........................ | 725/54 |

* cited by examiner

*Primary Examiner* — Jason Salce
(74) *Attorney, Agent, or Firm* — Seed IP Law Group PLLC

(57) ABSTRACT

One embodiment takes the form of a method and apparatus for sharing a purchased pay-per-view (PPV) event over a plurality of set-top boxes (STB). Thus, a PPV event purchased through one STB may be viewed through every STB associated with the customer ID number of the purchaser, including an STB located in a separate location from the PPV purchaser. The customer information used to locate the STBs associated with the customer ID may be retrieved from a database or may be provided by a billing site. Providing for the purchaser to view the PPV event on several STBs may allow the customer of the PPV service maximum access to the purchased PPV event.

19 Claims, 3 Drawing Sheets

PAY-PER-VIEW SHARING

TECHNICAL FIELD

The present invention relates generally to pay-per-view television, and more particularly to the sharing of a purchased pay-per-view event across multiple set-top boxes.

BACKGROUND

Many satellite and digital cable systems provide pay-per-view television events to their customers for purchase. While most television providers supply television channels to their customers for a monthly fee, pay-per-view events are typically single television events that must be purchased by the customer prior to viewing. For example, a pay-per-view event may be a sporting event or a movie that a customer may wish to spend extra money to view. Upon purchasing, the pay-per-view event is usually viewed on the purchaser's television like any other program offered by the television provider.

A typical satellite or digital cable television system providing pay-per-view events to the users of the system may include a set-top box that receives and decrypts the television signal such that a television program, or pay-per-view event, may be viewed by the user. In a satellite television system, the television signal is broadcast by a satellite, collected by a satellite dish and transmitted to the set-top box. In a digital cable system, the television signal is typically transmitted to the user through a cable connected directly to the set-top box.

The set-top box may decrypt the television signal and provide the decrypted signal to a television for the user to view. As part of the decryption process, the set-top box may include a smart card associated with the set-top box. The smart card may store user account information used by the set-top box to assist in the decryption of the television signal such that the user's television may display the provided program. The smart card may also store decryption information provided by the television system to decrypt pay-per-view events once the pay-per-view event is purchased by the user.

BRIEF SUMMARY

One common problem with purchasing pay-per-view events through a set-top box is that the pay-per-view event often may only be watched on the set-top box from which the event is purchased. This may be inconvenient for households with several set-top boxes connected to several televisions. For example, a user may purchase a pay-per-view event from a set-top box located in the living room of the user's house. However, once the event is purchased on the living room set-top box, the event may generally not be viewed through a separate set-top box located in the bedroom. Thus, the user must complete viewing of the pay-per-view event in the living room. Therefore, what is needed is a method and apparatus for viewing a pay-per-view event on several set-top boxes registered to the purchaser.

One embodiment may comprise a method for providing data to a plurality of receivers. The method may include receiving a request for the data from a user and requesting user identifying information from a database. The method may also include, in response to the request for the data, transmitting a first decryption code to a first receiver over a network connection with the first decryption code configured to allow decryption of the data. Also in response to the request for the data, the method may transmit a second decryption code to a second receiver over a satellite, with the second decryption code configured to allow decryption of the data.

A second embodiment may comprise a system for providing data to a plurality of receivers. The system may include an authentication site configured to receive a request for the data from a user. The authorization site may be further configured to provide a decryption code to a first one of the plurality of receivers to decrypt the data. The system may also include a database in communication with the authentication site configured to store user information and a satellite configured to receive the decryption code from the authentication site. The satellite may be further configured to transmit the decryption code to the plurality of receivers.

A third embodiment may comprise an apparatus for providing data to a plurality of receivers. The apparatus may include a receiving module configured to receive a request for the data from a user and a database configured to store user identification information about the user. The apparatus may also include a transmission module configured to automatically, in response to the request for the data, transmit a first decryption code to a first one of the plurality of receivers and a second decryption code to a second one of the plurality of receivers to allow the first receiver and the second receiver to decrypt the data.

DETAILED DESCRIPTION

One embodiment takes the form of a method and apparatus for sharing a purchased pay-per-view (PPV) event over a plurality of set-top boxes (STB). Thus, a PPV event purchased through one STB may be viewed through every STB associated the purchaser, including a STB located in a separate location from the purchaser. This functionality may provide to the customer of the PPV service enhanced access to the purchased PPV event.

The embodiment may automatically provide the PPV event to several STBs associated with the purchaser by accessing a database containing customer information. The customer information may include a customer ID identifier and a list of each STB registered to the user. The embodiment may use this information to tailor a decryption signal to the specific STBs that are registered to the purchaser. The decryption code may be used to decrypt the PPV signal such that the purchaser may view the PPV event on several STBs.

Figure 1:
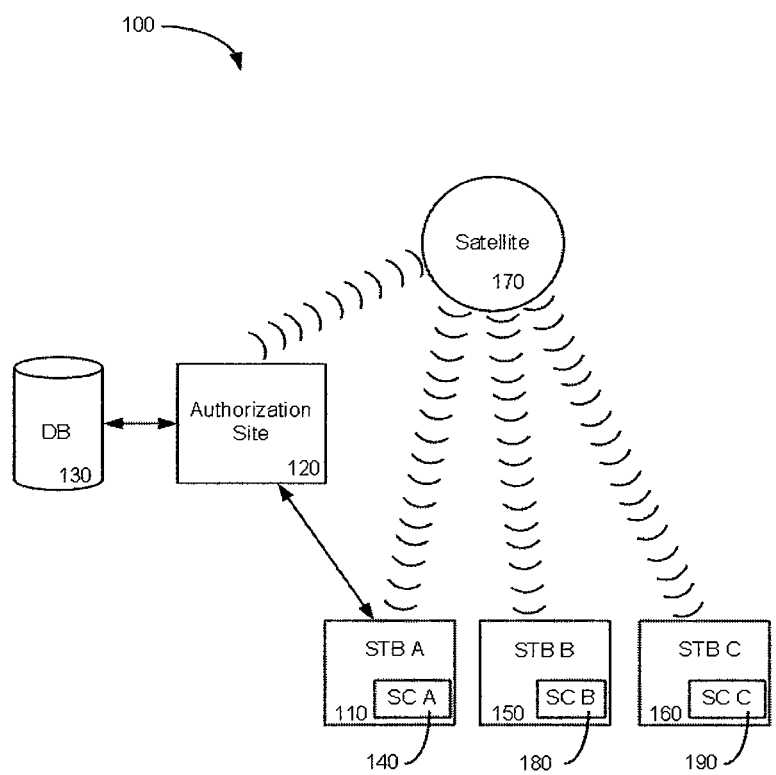
FIG. 1 depicts a first embodiment of a satellite television system permitting a PPV event purchased over a satellite television system to be viewed on a plurality of STBs.

FIG. 1 depicts one embodiment of a satellite television system providing a pay-per-view option. A customer may purchase a PPV event through his STB, represented by STB A 110. However, purchasing a PPV through the user's STB may only allow the user to view the PPV event on the STB the event was purchased through. Traditionally, the viewing of the event was limited to a single STB. To view the PPV event on multiple STBs generally required the user to contact an operator who would manually provide the decryption code to several STBs. By contrast, FIG. 1 depicts a system permitting a PPV event purchased over a satellite television system to be viewed on a plurality of STBs automatically. The PPV event may be purchased through any manner that allows the user to communicate the intent to purchase the PPV to the satellite television system.

One way in which the user may purchase the PPV event may be by utilizing a remote control to communicate with STB A 110 to purchase the event. STB A 110 may include a smart card 140 that is connected to STB A 110 and aids in identifying the STB to the satellite system and decrypting the satellite signal received by STB A 110. Smart card A 140 may store a unique identifier that may be used to identify the smart card. The unique smart card identifier, the STB that is associated with the card, and/or the customer account associated with the STB may be stored in the memory of STB A 110. During the request to purchase the PPV event, the request and the smart card 140 unique identifier, among other information, may be sent by STB A 110 to an authorization site 120 over a network connection. The network connection may include, but is not limited to, a standard plain old telephone service (POTS) line, integrated services digital network (ISDN) or internet protocol (IP) connection that connects directly into STB A 110. Alternatively, STB A 110 may connect to authorization site 120 wirelessly over a wireless network or cell phone network. Generally, the network connection may include any system of interconnected electronic components or circuits that allows STB A 110 to communicate to the authorization site 120.

After the authorization site 120 receives the request to purchase the PPV event from STB A 110, the authorization site may then access a database 130 containing subscriber information related to the satellite television system. The subscriber information may include, but is not limited to, the customer name, the customer billing address, customer ID number, the number of set-top boxes assigned to the customer and the unique smart card numbers for each STB assigned to the customer. The database 130 may be located in the same location as the authorization site 120 or it may be located remotely. The database 130 may be in communication with the authorization site 120 such that the authorization site may access and read customer information from the database.

The authentication site 120 may use the information gathered from the database 130 and the information provided to the authentication site by STB A 110 during the request to purchase the PPV event to provide a decryption code to STB A. The information may also be used by the authorization site 120 to provide separate decryption codes to STB B 150 and STB C 160. The decryption codes provided by the authorization site 120 to each STB may be specific to the smart card associated with the STB. For example, the decryption code provided to STB B 150 may be specific to smart card B 180 such that smart card B 180 may assist in decrypting the PPV signal. By providing a unique decryption code to each STB and its associated smart card, the authorization site 120 may control which STBs are capable of decrypting the PPV event being broadcast by a satellite 170. Without the decryption code supplied by the authorization site 120, a user may not be able to decrypt and view the PPV event.

The authentication site 120 may send the authorization signal containing the decryption code to STB A 110 over the connection between the authorization site 120 and STB A 110. Alternatively, the authorization signal may be transmitted to STB A 110 over a satellite or other wireless connection. STB A 110 may store the code for use in decrypting the PPV event being broadcast by the satellite 170. The authentication signal may be made unique to STB A 110 by encrypting the signal with the unique smart card number provided by STB A 110. Thus, smart card A 140 and STB A 110 may be the only STB that can decrypt the authentication signal, thereby preventing other STBs from inaccurately employing the authentication signal to decrypt content. When the encrypted PPV event is sent by the satellite 170 to STB A 110, the decryption code may be used by STB A 110 to decrypt the PPV event such that the event may be displayed on the user's television.

Through the above operations, a PPV event purchased by a user may be viewed through STB A 110. However, the authorization site 120 may not provide the decryption code to STB B 150 or STB C 160. This may occur for several reasons. One reason is that STB B 150 and STB C 160 may not be directly connected to the authentication site 120 to receive the decryption code directly. Another reason may be that the authorization site 120 may not have the necessary information about the customer to provide the decryption code to the STB B 150 and STB C 160, such as the unique smart card identifiers for each STB. Without receiving the authorization signal and decryption code provided by the authorization site 120, STB B 150 and STB C 160 may be unable to decrypt the PPV event thereby preventing the user from viewing the PPV event from those STBs.

The purchasing of a PPV event described above may allow the purchaser to view the PPV event on the STB through which the purchase was made. However, the purchaser may also desire to view the PPV event on other STBs registered to the purchaser. For example, STB A 110 may be located in a living room of the house of the purchaser. STB B 150 may be located in the bedroom of the house. Thus, the purchaser of the PPV event may purchase the event from STB A 110 located in the living room but may desire to view the event on STB B 150 located in the bedroom. Unless STB B 150 receives the proper decryption code, the user may not view the PPV event through STB B 150. It should be noted that it is not required that the STBs registered to the user be located in the same house. The plurality of STBs that may receive the decryption code to decrypt the PPV event may be located anywhere the satellite television system operates. For example, the user may have a STB located in a separate home than the primary STB. Thus, STB C 160 may be located remotely from STB A 110 and STB B 150 in a separate house. Thus, the user may purchase the PPV event from STB A 110 in the first house and may desire to view the event on STB C 160 in the second house.

To provide the decryption code to STB B 150 and STB C 160 so that the user may view the PPV event from those STBs, the authorization site 120 may send a decryption code unique to those STBs to a satellite 170 of the satellite television system 100. The satellite 170 may then re-broadcast the codes to STB B 150 and STB C 160 embedded in a standard transponder signal. For example, because STB B 150 is not directly connected to the authorization site 120, STB B may not receive a decryption code directly from the authorization site. Instead, the authorization site 120 may transmit a decryption code unique to STB B 150 for a PPV movie to the satellite 170. The satellite 170 may embed the decryption code within an entitlement management message (EMM) signal already being sent by the satellite 170 to the STB B 150. STB B 150 may receive the EMM signal containing the decryption code through a standard satellite dish connected to STB B. The decryption code may be removed from the EMM by associating the EMM signal with smart card B 180 linked to STB B 150. Thus, the EMM signal may be unique to smart card B 180, such that only a STB associated with smart card B 180 may decode the EMM signal. Once the decryption code for the PPV event is received, the code may be stored by STB B 150 on smart card B 180 for use in decryption of the PPV event.

When the encrypted PPV movie is sent from the satellite 170 to STB B 150, the stored decryption code may decrypt the signal such that the user may view the PPV movie. In a similar manner, a decryption code may also be sent to STB C 160 using smart card C 190 associated with STB C. Thus, the purchaser of the PPV movie may then watch the PPV event on either STB A 110, STB B 150 or STB C 160, since all three STBs may have a correct decryption code.

To prevent just any STB from receiving the decryption code for the PPV event from the satellite 170, the system 100 may identify which customer is purchasing the PPV event and which STBs are registered to that customer such only the STBs associated with the customer may receive the correct decryption codes. This may be done by accessing a database 130 containing customer information and providing one or more decryption codes over the satellite 170 in such a way as to allow the customer's STBs receive the decryption code. The decryption codes sent over the satellite 170 may be specific to the smart cards associated with the customer's STBs such that each STB may use the code and the smart card to decrypt the PPV event signal.

As stated above, each STB may include a smart card associated with each box, with each smart card including a unique ID number. The smart card ID number and the STB associated with the smart card may be maintained in a database 130 by the satellite television system 100. The database 130 may also include information about each customer to the satellite television system 100. The customer information may include a customer number for each customer or household. When a customer purchases satellite service, a customer ID number may be assigned to that customer. This ID number may also be associated with each STB and each smart card assigned to the customer. Thus, a customer may have several STBs and smart card IDs associated with one customer ID number. Similar to the smart card number above, the customer ID number may be stored in a database 130 that is maintained by the authorization site 120.

Upon receiving a request to purchase a PPV event from STB A 110, the authorization site 120 may retrieve the customer ID number associated with that customer. The authorization site 120 may also retrieve from the database 130 all other STBs and smart card numbers associated with that customer ID number. Once all of the STBs and smart card numbers are retrieved, the authorization site 120 may transmit the proper decryption codes to each of the user's STBs, either over the network connection or through a satellite 170. The decryption code may be unique to the STBs and smart cards associated with the customer ID number. Thus, only those STBs associated with the customer ID number will be able to employ the decryption code from the authorization site upon the purchase of the PPV event. It should also be noted that not every STB associated with the customer ID number may receive a decryption code. The embodiment may limit the number and type of STBs that receive a code.

Upon receiving the decryption code from the authorization site 120, the satellite 170 may include the decryption code to STB B 150 and STB C 160 as part of the signal being broadcast by the satellite 170. When the PPV event is broadcast by the satellite 170, STB B 150 and STB C 160 may use the stored decryption code to decrypt and watch the event. Thus, the PPV event purchased through STB A 110 may be viewed though either STB A 110, STB B 150 or STB C 160.

Figure 2:
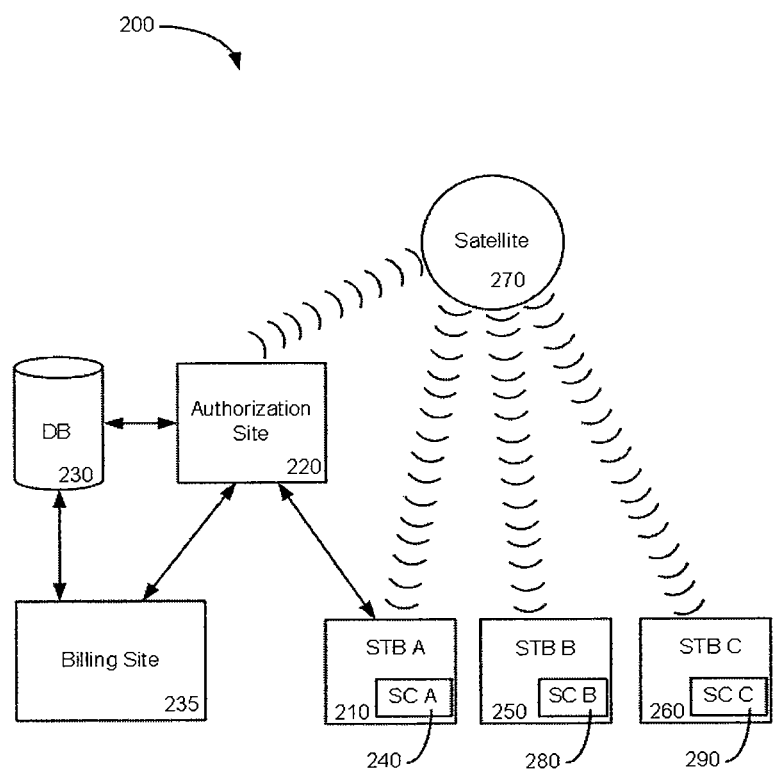
FIG. 2 depicts a second embodiment of a satellite television system including a billing site and providing a pay-per-view option that allows a user to watch the pay-per-view event on a plurality of set-top boxes.

FIG. 2 depicts a second embodiment of a satellite television system 200 including a billing site 235 and providing a pay-per-view option that allows a user to watch the pay-per-view event on a plurality of set-top boxes. Similar to the embodiment described above with reference to FIG. 1, this embodiment may automatically provide the PPV event to a plurality of STBs even if the STBs are not directly connected to the authorization site 220.

The process of purchasing a PPV event through the embodiment of FIG. 2 is similar to the process described in FIG. 1. The user may use a remote control that communicates with STB A 210 to purchase the PPV event. STB A 210 may communicate the request and other information to an authorization site 220. The authorization site 220 may retrieve information about the purchasing customer from a database 230 and use the customer information to generate decryption codes to be sent to the various STBs assigned to the customer. The authorization site 220 may provide a decryption code to STB A 210 directly and decryption codes to STB B 250 and STB C 260 through a satellite 270. Once the STBs have received the decryption codes, each STB may present the PPV event to the user.

The satellite television system 200 of FIG. 2 may also include a billing site 235. The billing site 235 may be used by the satellite system 200 to track billing and provide billing statements to the customers of the system. The billing site 235 may be maintained by the satellite provider or may be a third party hired by the satellite provider to perform the billing activities of the system. Furthermore, the billing site 235 may also provide the satellite system 200 with information about a PPV purchasing customer.

As described above, the authorization site 220 may access a database 230 containing information about the customer purchasing a PPV event to generate the correct decryption codes. Alternatively, the authorization site 220 may access a billing site 235 associated with the satellite television system 200 to retrieve customer information about the purchasing customer. As part of the billing services provided by the billing site 235, the billing site 235 may create, store and provide customer information to the satellite television system 200. For example, the billing site 235 may create a customer ID number for each customer billing address. The billing site 235 may also link several smart card numbers assigned to a single customer to that customer's ID number. Thus, any customer information needed by the satellite system 200 may be created and stored by the billing site 235.

Upon a request by the authorization site 220, the billing site 235 may provide the customer information directly to the authorization site 235. Alternatively, the billing site 235 may provide the customer information to a database 230 maintained by the satellite television system 200 to be stored for future use. This information may be used as described above by the system during a PPV event purchase by a user.

The billing site 235 may provide the customer information when the authorization site 220 provides the PPV event purchase request to the billing site 235. The billing site 235 may first be responsible for charging the customer's account with the PPV purchase. Further, in response to the request, the billing site 235 may provide to the authorization site 220 a signal indicating that the customer's account has been charged for the PPV event and information concerning the customer's account. The authorization site 220 may then automatically provide the decryption code for the PPV event to any of the customer's STBs, either through a direct connection between the STB and the authorization site or through a satellite 270 of the satellite system 200 using the customer information provided by the billing site 235. Thus, each STB associated with the customer's account may be used to view the PPV event.

Figure 3:
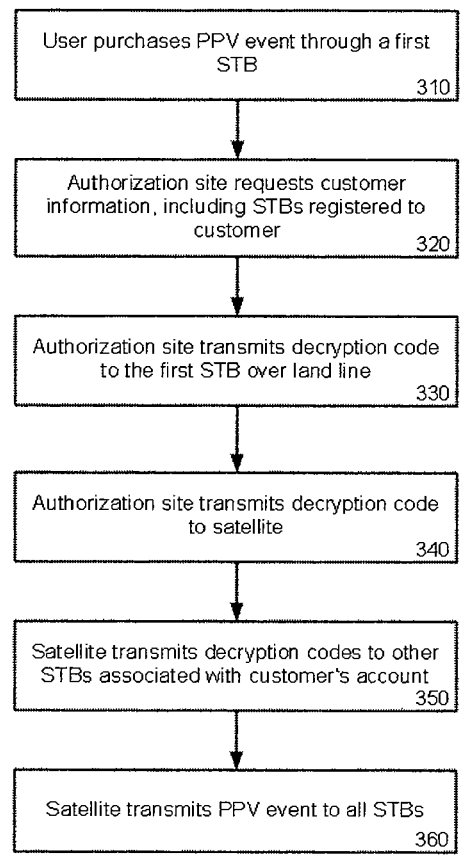
FIG. 3 depicts a flowchart of an embodiment that provides a pay-per-view event purchased through one set-top box to be viewed through several set-top boxes associated with the purchaser.

FIG. 3 depicts a flowchart of one embodiment that provides a pay-per-view event purchased through one STB to be viewed on several STBs associated with the purchaser. The embodiment may provide to the customer enhanced access to the purchased PPV event rather than limiting the viewing of the PPV event to a single STB.

The embodiment begins in operation 310 when the user purchases a PPV event through a first STB. As explained above, one way that a user may purchase the PPV event is by using a remote control to access the first STB. In operation 320, an authorization site may receive the request for the PPV purchase through a network connection to the first STB. Upon receiving the PPV purchase, the authorization site may access a database containing information about the user in operation 320. The information retrieved by the authorization site may include the customer's ID number, as well as all STBs associated with the customer and the related smart card numbers. As explained above, this information may be stored within the authorization site or it may be provided by a billing site. Alternatively, the authorization site may access the billing site directly to retrieve the customer information.

Once the authorization site receives the customer information, the authorization site may provide a code, or information to generate a code, to decrypt the PPV event to the first STB through the network connection in operation 330. This code may be stored by the first STB for use in decrypting the PPV event when the event is broadcast by the satellite television system. In operation 340, the authorization site may also automatically broadcast decryption codes for the other STBs associated with the purchaser of the PPV to a satellite for transmission.

The satellite may then transmit the codes to the other STBs associated with the user' account on an encrypted signal in operation 350. This signal may then be decrypted by the other STBs using the smart card associated with each STB. Once decrypted, the STBs may store the decryption codes to decrypt the PPV event when the event is broadcast by the satellite. In operation 360, the satellite may broadcast the PPV event to each STB. The STBs may use the codes provided by the authorization site to decrypt the event so the user may view the PPV event on any of the STBs.

It should be noted that the flowchart of FIG. 3 is illustrative only. Alternative embodiments of the present invention may add operations, omit operations, or change the order of operations without affecting the spirit or scope of the present invention.

The foregoing merely illustrates the principles of the invention. Various modifications and alterations to the described embodiments will be apparent to those skilled in the art in view of the teachings herein. It will thus be appreciated that those skilled in the art will be able to devise numerous systems, arrangements and methods which, although not explicitly shown or described herein, embody the principles of the invention and are thus within the spirit and scope of the present invention. From the above description and drawings, it will be understood by those of ordinary skill in the art that the particular embodiments shown and described are for purposes of illustration only and are not intended to limit the scope of the present invention. References to details of particular embodiments are not intended to limit the scope of the invention.

What is claimed is:

1. A method for providing data to a plurality of receivers, the method comprising:
   receiving a request for the data from a user;
   requesting user identifying information from a database;
   verifying that a first receiver is associated with the user based on the user identifying information by accessing a database that includes a user identifier of the user and a list of unique smart card identifiers, each associated with a different receiver assigned to the user;
   in response to the request for the data and the verification that the first receiver is associated with the user based on the user identifying information, transmitting a first decryption code to the first receiver over a network connection, the first decryption code specific to the smart card identifier associated with the first receiver and configured to allow decryption of the data; and
   in response to the same request for the data, enabling the data to be accessible to the user at the first receiver and a second receiver by:
      verifying that a second receiver is associated with the user based on the user identifying information by accessing the database that includes the user identifier of the user and the list of unique smart card identifiers, each associated with a different receiver assigned to the user; and
      transmitting a second decryption code to a second receiver over a satellite if the second receiver is also associated with the user based on the user identifying information, the second decryption code different than the first decryption code, specific to the smart card identifier associated with the second receiver and configured to allow decryption of the data.

2. The method of claim 1 further comprising:
   encrypting the data; and
   transmitting the encrypted data to the plurality of receivers.

3. The method of claim 1 wherein the data comprises a pay-per-view event and the plurality of receivers comprises a plurality of set-top boxes.

4. The method of claim 1 wherein the user identifying information comprises a customer identification number and information concerning the plurality of receivers including the list of unique smart card identifiers.

5. The method of claim 1 wherein the requesting operation further comprises:
   requesting the user identifying information from a database maintained by a billing site.

6. The method of claim 1 wherein the second decryption code is encrypted such that only the second receiver may decrypt the second decryption code.

7. A system for providing data to a plurality of receivers, the system comprising:
   an authentication site configured to:
      receive a request for data from a user;
      verify that a first receiver of a plurality of receivers is associated with the user based on user identifying information;
      in response to the same request for the data provide a first decryption code specific to a smart card identifier associated with the first receiver of the plurality of receivers to decrypt the data if the first receiver of the plurality of receivers is associated with the user; and
      in response to the same request for the data:
         verify that a second receiver of the plurality of receivers is associated with the user based on the user identifying information; and
         provide a second decryption code different than the first decryption code, specific to a smart card identifier associated with the second receiver of the plurality of receivers to decrypt the data if the second receiver of the plurality of receivers is associated with the user;
   a database in communication with the authentication site configured to store the user identifying information and includes a user identifier of the user and a list of unique smart card identifiers, each associated with a different receiver assigned to the user to verify the association of the plurality of receivers with the user; and a satellite configured to receive the first and second decryption codes from the authentication site, the satellite further configured to transmit the decryption codes as applicable to the plurality of receivers.

8. The system of claim 7 further comprising:
a billing site configured to receive the request for the data from the authentication site, the billing site further configured to provide the user information to the database.

9. The system of claim 7 wherein the database is located at the billing site.

10. The system of claim 7 wherein the authentication site transmits the decryption first and second decryption codes as applicable to the satellite in response to the user information.

11. The system of claim 7 wherein the first one of the plurality of receivers includes a smart card, the smart card including a unique identification number that is the smart card identifier associated with the first receiver included in the list of unique smart card identifiers.

12. The system of claim 11 wherein the unique identification number is received by the authentication site with the request for the data.

13. The system of claim 7 wherein the data comprises a pay-per-view event and the plurality of receivers comprise a plurality of set-top boxes.

14. An apparatus for providing data to a plurality of receivers, the apparatus comprising:
a receiving module configured to receive a request for the data from a user;
a database configured to store user identification information about the user;
a computer processor configured to:
in response to the request for the data, verify that a first receiver of a plurality of receivers is associated with the user based on the user identification information by accessing the database that includes a user identifier of the user and a list of unique smart card identifiers, each associated with a different receiver assigned to the user; and
in response to the request for the data, verify that a second receiver of the plurality of receivers is associated with the user based on the user identification information by accessing the database that includes the user identifier of the user and the list of unique smart card identifiers, each associated with a different receiver assigned to the user; and
a transmission module configured to automatically, in response to the same request for the data and verification that the first receiver of a plurality of receivers and the second receiver of the plurality of receivers is associated with the user based on the user identification information, transmit a first decryption code specific to the smart card identifier associated with the first receiver of the plurality of receivers and a second decryption code different than the first decryption code, specific to the smart card identifier associated with the second receiver of the plurality of receivers, if the second receiver is also associated with the user based on the user identification information to allow the first receiver and the second receiver to decrypt the data.

15. The apparatus of claim 14 wherein the data comprises a pay-per-view event and the request for data comprises a purchase request for the pay-per-view event.

16. The apparatus of claim 14 wherein the database is further configured to store a user identification number.

17. The apparatus of claim 14 wherein the first decryption code is transmitted to the first receiver of the plurality of receivers over a network connection.

18. The apparatus of claim 14 wherein the second decryption code is transmitted to the second receiver of the plurality of receivers over a satellite.

19. The apparatus of claim 14 wherein the receiving module is configured to receive the request for the data over a network connection.

* * * * *